United States Patent
Matsunaga et al.

(10) Patent No.: US 10,453,582 B2
(45) Date of Patent: Oct. 22, 2019

(54) COPPER ALLOY FOR ELECTRONIC/ELECTRICAL DEVICE, COPPER ALLOY PLASTICALLY-WORKED MATERIAL FOR ELECTRONIC/ELECTRICAL DEVICE, COMPONENT FOR ELECTRONIC/ELECTRICAL DEVICE, TERMINAL, AND BUSBAR

(71) Applicant: MITSUBISHI MATERIALS CORPORATION, Tokyo (JP)

(72) Inventors: Hirotaka Matsunaga, Okegawa (JP); Kazunari Maki, Saitama (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 15/543,664

(22) PCT Filed: Sep. 8, 2016

(86) PCT No.: PCT/JP2016/076362
§ 371 (c)(1),
(2) Date: Jul. 14, 2017

(87) PCT Pub. No.: WO2017/043551
PCT Pub. Date: Mar. 16, 2017

(65) Prior Publication Data
US 2018/0040389 A1    Feb. 8, 2018

(30) Foreign Application Priority Data

Sep. 9, 2015  (JP) ................... 2015-177743
Dec. 1, 2015  (JP) ................... 2015-235096

(51) Int. Cl.
*H01B 1/02* (2006.01)
*C22C 9/00* (2006.01)
(Continued)

(52) U.S. Cl.
CPC ............... *H01B 1/026* (2013.01); *C22C 9/00* (2013.01); *C22F 1/08* (2013.01); *H01B 5/02* (2013.01); *C22F 1/00* (2013.01); *H02G 5/00* (2013.01)

(58) Field of Classification Search
CPC .. H01B 1/026; H01B 1/02; H01B 5/02; C22C 9/00; C22F 1/08; C22F 1/00; H02G 5/00
(Continued)

(56) References Cited

U.S. PATENT DOCUMENTS 3,677,745 A   7/1972  Finlay et al.
3,778,318 A   12/1973 Hay et al.
(Continued)

FOREIGN PATENT DOCUMENTS

CN    1574107 A    2/2005
CN    102108457 A  6/2011
(Continued)

OTHER PUBLICATIONS

Office Action dated Apr. 4, 2018 for the corresponding Chinese Patent Application No. 201680008019.8.
(Continued)

*Primary Examiner* — Mark Kopec
(74) *Attorney, Agent, or Firm* — Leason Ellis LLP

(57) ABSTRACT

A copper alloy for and electric and an electronic device is provided. The copper alloy includes: Mg in a range of 0.15 mass % or more and less than 0.35 mass %; P in a range of 0.0005 mass % or more and less than 0.01 mass %; and a Cu balance including inevitable impurities. In the copper alloy, a Mg content [Mg] and a P content [P], both of which are in a mass ratio, satisfy a relationship expressed by $[Mg]+20\times[P]<0.5$, and an electrical conductivity of the copper alloy is more than 75% IACS.

11 Claims, 1 Drawing Sheet

(51) Int. Cl.
    *C22F 1/00*     (2006.01)
    *C22F 1/08*     (2006.01)
    *H01B 5/02*     (2006.01)
    *H02G 5/00*     (2006.01)

(58) Field of Classification Search
    USPC .......................................................... 252/500
    See application file for complete search history.

(56) References Cited

U.S. PATENT DOCUMENTS

| | | | |
|---|---|---|---|
| 5,486,244 | A | 1/1996 | Caron et al. |
| 5,667,752 | A | 9/1997 | Suzuki et al. |
| 2002/0044881 | A1 | 4/2002 | Breedis et al. |
| 2004/0238086 | A1 | 12/2004 | Saleh |
| 2009/0239398 | A1 | 9/2009 | Lynch et al. |
| 2010/0269963 | A1 | 10/2010 | Hirose et al. |
| 2011/0146855 | A1 | 6/2011 | Sakurai et al. |
| 2014/0193293 | A1 | 7/2014 | Shishido et al. |
| 2014/0209221 | A1 | 7/2014 | Kumagai et al. |
| 2014/0283962 | A1 | 9/2014 | Ito et al. |
| 2018/0187292 | A1 | 7/2018 | Matsunaga et al. |

FOREIGN PATENT DOCUMENTS

| | | | |
|---|---|---|---|
| CN | 102203916 | A | 9/2011 |
| JP | 61-284946 | A | 12/1986 |
| JP | 05-311283 | A | 11/1993 |
| JP | 2007-056297 | A | 3/2007 |
| JP | 2009-228013 | A | 10/2009 |
| JP | 2011-174127 | A | 9/2011 |
| JP | 2011-241412 | A | 12/2011 |
| JP | 2012-007231 | A | 1/2012 |
| JP | 5045783 | B | 10/2012 |
| JP | 2013-253267 | A | 12/2013 |
| JP | 2014-025089 | A | 2/2014 |
| JP | 2014-047378 | A | 3/2014 |
| JP | 2014047378 | A * | 3/2014 |
| JP | 2014-114464 | A | 6/2014 |
| JP | 2015-045083 | A | 3/2015 |

OTHER PUBLICATIONS

International Search Report dated Dec. 6, 2016 for the corresponding PCT Application No. PCT/JP2016/076387.
International Search Report dated Nov. 8, 2016 for the corresponding PCT Application No. PCT/JP2016/076376.
International Search Report dated Nov. 8, 2016 for the corresponding PCT Application No. PCT/JP2016/076456.
International Search Report dated Nov. 8, 2016 for the corresponding PCT Application No. PCT/JP2016/076362.
Notice of Allowance dated May 9, 2017 for the corresponding Japanese Patent Application No. 2016-575989.
David Chapman "High Conductivity Copper for Electrical Engineering", May 31, 1998 [Retrieved from the Internet on Jul. 2, 2018].
R. Sundberg et al., "The Cu—Mg—P system: precipitation phenomena and physical properties", *Metal Technology*, Dec. 31, 1979, pp. 230-234, vol. 6, No. 1.
Extended European Search Report dated Jul. 11, 2018 for the related European Patent Application No. 16844412.3.
Chinese Office Action dated Dec. 27, 2018 for the related Chinese Application No. 201680008019.8.
Chinese Office Action dated Nov. 27, 2018 for the related Chinese Application No. 201680032061.3.
Office Action dated Feb. 28, 2019 in corresponding European Application No. 16844412.3.
Supplemental European Search Report dated Mar. 7, 2019 in corresponding European Application No. 16844420.6.
David Chapman: "Coatings" In: "Copper for Busbars", May 31, 2014 (May 31, 2014), Copper Development Association, pp. 103-105.
Maki et al., "Solid-solution copper alloys with high strength and high electrical conductivity", *Scripta Materialia*, Jan. 2, 2013, pp. 777-780, vol. 68, No. 10, Elsevier, Amsterdam, NL.
Maki et al., "Supplementary information to Solid-solution copper alloys with high strength and high electrical conductivity", *Scripta Materialia*, vol. 68, No. 10, Jan. 2, 2013, pp. 777-780.
Zhu et al., "Effect of ECAP combined cold working on mechanical properties and electrical conductivity of Conform-produced Cu—Mg al", *Journal of Alloys and Compounds*, vol. 582, Aug. 14, 2013, pp. 135-140.
Asm "Casting of Copper and Copper Alloys" In: "Casting", *ASM International*, Dec. 31, 2008, pp. 1026-1048.
Search Report dated Apr. 17, 2019 for the corresponding European Patent Application No. 16844417.2.
Search Report dated Apr. 18, 2019 for the corresponding European Patent Application No. 16844438.8.
Jingpu Wang et al., "Cable Materials," *Mechanical Industry Press*, Nov. 1983, pp. 80- 81.
Office Action dated Jun. 12, 2019 for the corresponding Chinese Patent Application No. 201680008019.8.
Office Action dated Jul. 11, 2019 for the related U.S. Appl. No. 15/737,642.
Office Action dated Aug. 28, 2019 for the related U.S. Appl. No. 15/741,148.

\* cited by examiner

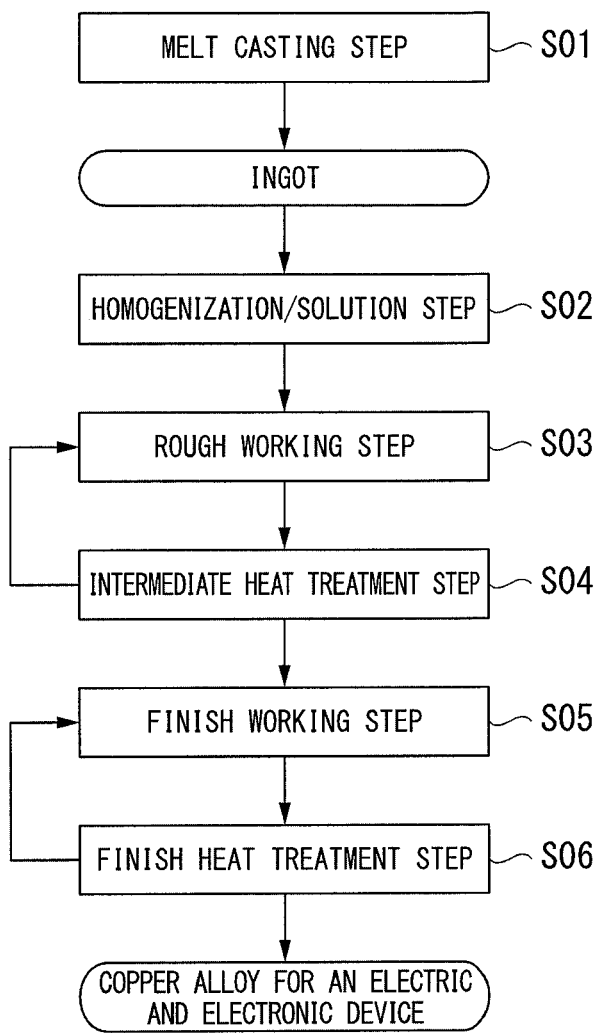

COPPER ALLOY FOR ELECTRONIC/ELECTRICAL DEVICE, COPPER ALLOY PLASTICALLY-WORKED MATERIAL FOR ELECTRONIC/ELECTRICAL DEVICE, COMPONENT FOR ELECTRONIC/ELECTRICAL DEVICE, TERMINAL, AND BUSBAR

CROSS-REFERENCE TO RELATED PATENT APPLICATIONS

This application is a U.S. National Phase Application under 35 U.S.C. § 371 of International Patent Application No. PCT/JP2016/076362 filed on Sep. 8, 2016 and claims the benefit of Japanese Patent Applications No. 2015-177743 filed on Sep. 9, 2015 and No. 2015-235096 filed on Dec. 1, 2015, all of which are incorporated herein by reference in their entirety. The International Application was published in Japanese on Mar. 16, 2017 as International Publication No. WO/2017/043551 under PCT Article 21(2).

FIELD OF THE INVENTION

The present invention relates to a copper alloy for an electronic and electric device, which is suitable for terminals such as lead frames, connectors, press-fits and the like; a plastically-worked copper alloy material for an electronic and electric device made of the copper alloy for an electronic and electric device; a component for an electronic and electric device; a terminal; and a busbar.

BACKGROUND OF THE INVENTION

Conventionally, highly conductive copper or copper alloy is used for an electronic or electric device such as terminals of connectors, press-fits, or the like; relays; lead frames; bus bars; and the like.

In response to the size reduction of an electronic, an electric device, and the like, there have been attempts to reduce the size and thickness of components for an electronic and electric device used in the electronic device and electric device. Therefore, high strength and excellent bendability are required for the material constituting the component of the electronic or electric device. In addition, the stress relaxation resistance is needed for the terminals of connectors used in a high temperature environment such as in the engine room of an automobile or the like.

For example, Cu—Mg alloys are proposed in Japanese Unexamined Patent Application, First Publication No. 2007-056297 (A) and Japanese Unexamined Patent Application, First Publication No. 2014-114464 (A) as a material used for the electronic and electric device such as terminals; relays; lead frames; busbars; and the like.

Technical Problem

However, the cold workability and the bendability are insufficient in the Cu—Mg alloy described in Japanese Unexamined Patent Application, First Publication No. 2007-056297 (A) since the P content is 0.08-0.35 mass % and high. Thus, it is hard to shape the component for the electronic or electric device in a predetermined shape.

In addition, coarse precipitates are formed in the Cu—Mg alloy described in Japanese Unexamined Patent Application, First Publication No. 2014-114464 (A) since the Mg content is 0.01-0.5 mass % and the P content is 0.01-0.5 mass %. Thus, the cold workability and the bendability are insufficient.

Moreover, in the above-described Cu—Mg alloys, there is a problem of castability being reduced without addition of P since the viscosity of the copper alloy melt is increased by Mg.

The present invention is made under the circumstances described above. The purpose of the present invention is to provide a copper alloy for an electronic or electric device, a plastically-worked copper alloy material for an electronic or electric device, a component for an electronic or electric device, a terminal, and a busbar, all of which have excellent electrical conductivity, strength, bendability, stress relaxation resistance, and castability.

SUMMARY OF THE INVENTION

Solution to Problem

The inventors of the present invention conducted intensive studies to solve the above-described problems and found that: coarsening of precipitates including Mg and P is suppressed by setting the contents of Mg and P included in the alloy in a range defined by a predetermined relational expression; and the strength, the stress relaxation resistance, and the castability can be improved without deteriorating the workability.

The present invention is made under the circumstances described above. An aspect of the present invention is a copper alloy for an electronic and electric device (hereinafter, referred as "the copper alloy for an electronic and electric device of the present invention"), including: Mg in a range of 0.15 mass % or more and less than 0.35 mass %; P in a range of 0.0005 mass % or more and less than 0.01 mass %; and a Cu balance including inevitable impurities, wherein a Mg content [Mg] and a P content [P], both of which are in a mass ratio, satisfy a relationship expressed by [Mg]+20×[P]<0.5, and an electrical conductivity of the copper alloy is more than 75% IACS.

According to the copper alloy for an electronic and electric device configured as described above, the strength and the stress relaxation resistance can be improved without greatly decreasing the electrical conductivity by solid melting Mg in the Cu matrix phase since the Mg content is in the range of 0.15 mass % or more and less than 0.35 mass %

In addition, the castability can be improved since it includes P in the range of 0.0005 mass % or more and less than 0.01 mass %.

In addition, formation of coarse precipitates including Mg and P can be suppressed since the Mg content [Mg] and the P content [P], both of which are in a mass ratio, satisfy the relationship expressed by [Mg]+20×[P]<0.5. Accordingly, reduction of the cold workability and the bendability can be suppressed In addition, the alloy can be used for the application in which the pure copper has been used conventionally, since the electrical conductivity of the alloy is more than 75% IACS.

In the copper alloy for an electronic and electric device of the present invention, the Mg content [Mg] and the P content [P], both of which are in a mass ratio, may satisfy a relationship expressed by [Mg]/[P]≤400.

In this case, the castability can be improved reliably by defining the ratio between the content of Mg, which reduces the castability, and the content of P, which improves the castability, as described above.

In addition, in the copper alloy for an electronic and electric device of the present invention, a 0.2% yield strength may be 300 MPa or more.

In this case, the copper alloy is not deformed easily since the 0.2% yield strength is set to 300 MPa or more. Thus, the copper alloy is particularly suitable for the copper alloy for an electronic and electric device, such as: terminals of connectors, press-fits or the like; relays; lead frames; busbars and the like.

In addition, in the copper alloy for an electronic and electric device of the present invention, a residual stress ratio may be 50% or more at 150° C. for 1000 hour.

In this case, the permanent deformation can be kept small even if the copper alloy is used in a high-temperature environment since the residual stress is defined as described above. Thus, reduction of the contact pressure of connector terminals or the like can be suppressed, for example. Therefore, the copper alloy can be applied to the materials for a component of an electronic and electric device used in a high-temperature environment such as the engine room and the like.

Other aspect of the present invention is a plastically-worked copper alloy material for an electronic and electric device (hereinafter, referred as "the plastically-worked copper alloy material") made of the above-described copper alloy for an electronic and electric device.

According to the plastically-worked copper alloy material configured as described above, the plastically-worked copper alloy material has excellent electrical conductivity, strength, bendability, and stress relaxation resistance, since it is made of the above-described copper alloy for an electronic and electric device. Thus, the plastically-worked copper alloy material is particularly suitable for the material of an electronic and electric device, such as: terminals of connectors, press-fits or the like; relays; lead frames; busbars and the like.

In the plastically-worked copper alloy material of the present invention, a Sn plating layer or a Ag plating layer may be provided on a surface of the plastically-worked copper alloy material.

In this case, the plastically-worked copper alloy material is particularly suitable for the material of an electronic and electric device, such as: terminals of connectors, press-fits or the like; relays; lead frames; busbars and the like since the Sn plating layer or the Ag plating layer is provided on the surface of the plastically-worked copper alloy material. In the present invention, "the Sn plating" includes a Sn plating of the pure Sn and a plating of an Sn alloy; and "the Ag plating" includes a plating made of the pure Ag and a plating made of a Ag alloy.

Other aspect of the present invention is a component for an electronic and electric device (hereinafter, referred as "the component for an electronic and electric device of the present invention") made of the above-described plastically-worked copper alloy material for an electronic and electric device. The component for an electronic and electric device of the present invention includes: terminals of connectors, press-fits or the like; relays; lead frames; busbars and the like.

The component for an electronic and electric device configured as described above can exhibit excellent properties even if it is down-sized and thinned since it is produced by using the plastically-worked copper alloy material described above.

Other aspect of the present invention is a terminal (hereinafter, refereed as "the terminal of the present invention") made of the above-described plastically-worked copper alloy material for an electronic and electric device.

The terminal configured as described above can exhibit excellent properties even if it is down-sized and thinned since it is produced by using the plastically-worked copper alloy material described above.

Other aspect of the present invention is a busbar (hereinafter, referred as "the busbar of the present invention") made of the above-described plastically-worked copper alloy material for an electronic and electric device.

The busbar configured as described above can exhibit excellent properties even if it is down-sized and thinned since it is produced by using the plastically-worked copper alloy material described above.

Advantageous Effects of Invention

According to the present invention, a copper alloy for an electronic and electric device; a plastically-worked copper alloy material for an electronic and electric device; a component for an electronic and electric device; a terminal; and a busbar, each of which has excellent electrical conductivity, strength, bendability, stress relaxation resistance and castability, can be provided.

BRIEF DESCRIPTION OF THE DRAWING

FIG. 1 is a flowchart of a method of producing the copper alloy for an electronic and electric device of an embodiment of the present invention.

DETAILED DESCRIPTION OF THE INVENTION

A copper alloy for an electronic or electric device, which is an embodiment of the present invention, is explained below.

The copper alloy for an electronic or electric device of the present embodiment includes: Mg in the range of 0.15 mass % or more and less than 0.35 mass %; P in the range of 0.0005 mass % or more and less than 0.01 mass %; and the Cu balance including inevitable impurities.

In addition, the Mg content [Mg] and the P content [P], both of which are in a mass ratio, satisfy the relationship expressed by $[Mg]+20\times[P]<0.5$ in the copper alloy.

Moreover, the Mg content [Mg] and the P content [P], both of which are in a mass ratio, satisfy the relationship expressed by $[Mg]/[P] \leq 400$, in the present embodiment.

In addition, the electrical conductivity is set to more than 75% IACS in the copper alloy for an electronic or electric device of the present embodiment.

In addition, the 0.2% yield strength is 300 MPa or more when the tensile test is carried out in the direction orthogonal to the rolling direction. in the copper alloy for an electronic or electric device of the present embodiment. In other words, the copper alloy is a rolled material of the copper alloy for an electronic or electric device; and the 0.2% yield strength in the tensile test carried out in the direction orthogonal to the rolling direction in the final rolling process is set as described above in the present embodiment.

In addition, the residual stress ratio is 50% or more at 150° C. for 1000 hours in the copper alloy for an electronic or electric device of the present embodiment.

Reasons for setting the component compositions as described above are explained below.

(Mg: 0.15 Mass % or More and Less than 0.35 Mass %)

Mg is an element having effect of improving the strength and the stress relaxation resistance by solid melting copper alloy in the matrix, while high electrical conductivity is retained.

If the Mg content were less than 0.15 mass %, there would be a possibility that the above-described effect cannot be obtained sufficiently. On the other hand, if the Mg content were 0.35 mass % or more, there would be a possibility that the electrical conductivity is significantly reduced and the viscosity of the melted copper alloy is increased for the castability to be reduced.

Accordingly, the Mg content is set to the range of 0.15 mass % or more and less than 0.35 mass % in the present embodiment.

In order to further improve the strength and the stress relaxation resistance, it is preferable that the lower limit of the Mg content is set 0.18 mass % or more. It is more preferable that the lower limit of the Mg content is set to 0.2 mass % or more. In addition, in order to reliably suppress reduction of the electrical conductivity and castability, it is preferable that the upper limit of the Mg content is set to 0.32 mass % or less. It is more preferable that the upper limit of the Mg content is set to 0.3 mass % or less.

(P: 0.0005 Mass % or More and Less than 0.01 Mass %)

P is an element having effect of improving castability.

If the P content were less than 0.0005 mass %, there would be a possibility that the above-described effect cannot be obtained sufficiently. On the other hand, if the P content were 0.01 mass % or more, there would be a possibility that cracking occurs in cold working or bending since coarse precipitates containing Mg and P are formed; and these precipitates become start points of breakage.

Accordingly, the P content is set to the range of 0.0005 mass % or more and less than 0.01 mass % in the present embodiment. In order to reliably improve the castability, it is preferable that the lower limit of the P content is set to 0.001 mass % or more. It is more preferable that the lower limit of the P content is set to 0.002 mass % or more. In addition, in order to reliably suppress formation of the coarse precipitates, it is preferable that the upper limit of the P content is set to less than 0.009 mass %. It is more preferable that the upper limit of the P content is set to less than 0.008 mass %. It is most preferable that the upper limit of the P content is set to less than 0.0075 mass %.

([Mg]+20×[P]<0.5)

As described above, the precipitates containing Mg and P are formed by having Mg and P coexist.

If the value of [Mg]+20×[P] were 0.5 or more where [Mg] is the Mg content and [P] is the P content in mass ratio, there would be a possibility that cracking occurs in cold working or bending since the total amount of Mg and P is excessive; the precipitates containing Mg and P are coarsened and distributed in high density.

Accordingly, [Mg]+20×[P] is set to less than 0.5 in the present embodiment. In order to reliably suppress: the coarsening and high-densification of the precipitates; and formation of cracking in cold working or bending, it is preferable that [Mg]+20×[P] is set to less than 0.48. It is more preferable that [Mg]+20×[P] is set to less than 0.46.

([Mg]/[P]≤400)

In order to reliably improve castability, it is necessary for the ratio of the Mg and P contents to be optimized since Mg is an element having effect of increasing the viscosity of the copper alloy melt and reducing the castability.

If [Mg]/[P] exceeded 400 where [Mg] is the Mg content and [P] is the P content in mass ratio, there would be a possibility that the effect of improving the castability by adding P is reduced since the Mg content relative to P is increased.

Accordingly, [Mg]/[P] is set to 400 or less in the present embodiment. In order to further improve the castability, it is preferable that [Mg]/[P] is set to 350 or less. It is more preferable that [Mg]/[P] is set to 300 or less.

If [Mg]/[P] were excessively low, there would be a possibility that Mg is consumed as the precipitates; and the effect because of solid soluting of Mg cannot be obtained. In order to reliably improve the yield strength and the stress relaxation resistance because of solid soluting of Mg by suppressing the formation of the precipitates containing Mg and P, it is preferable that the lower limit of [Mg]/[P] is set to a value exceeding 20. It is more preferable that the lower limit of [Mg]/[P] is set to a value exceeding 25.

(Inevitable Impurities: 0.1 Mass % or Less)

As other inevitable impurities, Ag; B; Ca; Sr; Ba; Sc; Y; rare earth elements; Ti; Zr; Hf; V; Nb; Ta; Cr; Mo; W; Mn; Re; Fe; Ru; Os; Co; Se; Te; Rh; Ir; Ni; Pd; Pt; Au; Zn; Cd; Hg; Al; Ga; In; Ge; Sn; As; Sb; Tl; Pb; Bi; Be; N; C; Si; Li; H; O; S; or the like can be named. The total amount of these inevitable impurities is set to 0.1 mass % or less since they have action to reduce electrical conductivity. It is preferable that the total content of the inevitable impurities is set to 0.09 mass % or less. It is more preferable that the total content of the inevitable impurities is set to 0.08 mass % or less.

Since Ag, Zn, and Sn are easily mixed in Cu for the electrical conductivity to be reduced, it is preferable that the total amount of Ag, Zn, and Sn is set to less than 500 mass ppm.

Moreover, Si, Cr, Ti, Zr, Fe and Co particularly reduce the electrical conductivity significantly and deteriorate the bendability by forming inclusion bodies. Thus, it is preferable that the total amount of Si, Cr, Ti, Zr, Fe and Co is set to less than 500 mass ppm.

(Electrical Conductivity: Exceeding 75% IACS)

The copper alloy for an electronic or electric device of the present embodiment can be suitably used as a component for an electronic or electric device such as: terminals of connectors, press-fits, or the like; relays; lead frames; busbars; and the like by setting the electric conductivity to a value exceeding 75% IACS.

It is preferable that the electrical conductivity is set to more than 76% IACS. More preferably, it is more than 77% IACS. Even more preferably, it is more than 78% IACS.

(0.2% Yield Strength: 300 MPa or More)

The copper alloy for an electronic or electric device of the present embodiment becomes a particularly suitable material of a component for an electronic or electric device such as: terminals of connectors, press-fits, or the like; relays; lead frames; busbars; and the like by setting the 0.2% yield strength to 300 MPa or more. In the present embodiment, 0.2% yield strength when the tensile test is carried out in the direction orthogonal to the rolling direction is 300 MPa or more. It is preferable that the 0.2% yield strength is set to 325 MPa or more. More preferably, it is set to 350 MPa or more.

(Residual Stress Ratio: 50% or More)

The residual stress ratio is set to 50% or more at 150° C. for 1000 hours in the copper alloy for an electronic or electric device of the present embodiment. In the case where the residual stress ratio under the above-described condition is high, the permanent deformation can be kept small; and reduction of the contact pressure can be suppressed even if it is used in a high-temperature environment. Thus, the copper alloy for an electronic or electric device of the present embodiment can be applied as the terminal used in a high-temperature environment such as locations around the engine room of an automobile. In the present embodiment, the residual stress ratio when the tensile test is carried out a tensile test in the direction orthogonal to the rolling direction is set to 50% or more at 150° C. for 1000 hours.

It is preferable that the residual stress ratio is set to 60% or more at 150° C. for 1000 hours. More preferably, it is set to 70% or more at 150° C. for 1000 hours.

Next, a method of producing a copper alloy for an electronic and electric device of the present embodiment as configured above is explained in reference to the flowchart in FIG. 1.

(Melt Casting Step S01)

First, components are adjusted by adding the above-described elements to molten copper obtained by melting a copper raw material, thereby producing a molten copper alloy. Meanwhile, as each of elements added, it is possible to use a single body of the element, an alloy of the element, or the like. In addition, a raw material including the element may be melted together with the copper raw material. In addition, a recycled material or a scrapped material of the present alloy may also be used. Here, the molten copper is preferably a so-called 4NCu having purity set to 99.99% by mass or more: or a so-called 5NCu having purity set to 99.999% by mass or more. In the melting step, it is preferable to perform atmosphere melting in an inert gas atmosphere with a low vapor pressure of $H_2O$ and keep the retention time in melting to the minimum in order to suppress oxidation of Mg; and reduce the hydrogen concentration.

Then, the ingot is produced by pouring the copper alloy melt with the adjusted component composition. In consideration of mass production, it is preferable that the continuous casting method or the semi-continuous casting method is used.

At this time, precipitates containing Mg and P are formed in solidification of the melt. Thus, by increasing the solidification rate, the size of the precipitates can be miniaturized further. Therefore, it is preferable that the cooling rate of the melt is set to 0.1° C./sec or more. More preferably, it is set to 0.5° C./sec or more. Most preferably, it is set to 1° C./sec or more.

(Homogenization/Solution Treatment Step S02)

Next, a heating treatment is carried out in order for homogenization of the obtained ingot and formation of a solid solution. Inside the ingot, an intermetallic compound including Cu and Mg as major components which is generated by Mg being condensed due to segregation in a solidification step is present. Therefore, in order to remove or reduce the segregation and the intermetallic compound, a heating treatment in which the ingot is heated to a temperature in a range of 300° C. to 900° C. is carried out, thereby homogeneously dispersing Mg or dissolving Mg in the matrix in the ingot. Meanwhile, this homogenization/solution treatment step S02 is preferably carried out in a non-oxidizing or reducing atmosphere.

Here, when the heating temperature is lower than 300° C., formation of a solid solution becomes incomplete, and there is a concern that a large amount of an intermetallic compound including Cu and Mg as major components may remain in the matrix. On the other hand, when the heating temperature exceeds 900° C., some of the copper material turns into a liquid phase, and there is a concern that the structure or the surface state may become uneven. Therefore, the heating temperature is set in a range of 300° C. to 900° C.

Hot working may be performed after the above-described homogenization/solution treatment step S02 for efficient rough rolling which is described below and homogenization of the structure. In this case, the processing method is not particularly limited. For example, rolling, drawing, extrusion, groove rolling, forging, pressing, or the like can be used. In addition, it is preferable that the temperature of hot working is set to the range of 300° C. or more and 900° C. or less.

(Rough Working Step S03)

In order to shape the material into a predetermined shape, rough working is performed. The temperature condition in the rough working step S03 is not particularly limited. However, it is preferable that the temperature condition is set to the range of −200° C. to 200° C., which corresponds to cold or warm rolling, in order to suppress recrystallization or to improve dimensional accuracy. It is particularly preferable that the temperature condition is a room temperature. It is preferable that the processing ratio is 20% or more. More preferably, it is 30% or more. The processing method is not particularly limited. For example, rolling, drawing, extrusion, groove rolling, forging, pressing, or the like can be used (Intermediate Heat Treatment Step S04)

After the rough working step S03, a heat treatment is carried out for softening, which aims to reliably form a solid solution, form a recrystallized structure or improve working properties. A method for the heat treatment is not particularly limited; however, preferably, the heat treatment is carried out: at a holding temperature of 400° C. to 900° C.; for a retention time of 10 seconds or more and 10 hours or less; in a non-oxidizing atmosphere or a reducing atmosphere. In addition, the cooling method after heating is not particularly limited. However, it is preferable that a method such as the water quenching and the like having the cooling rate of 200° C./min or more is used.

Meanwhile, the rough working step S03 and the Intermediate heat treatment step S04 may be repeatedly carried out.

(Finish Working Step S05)

The copper material which has been subjected to the Intermediate heat treatment step S04 is finish-worked in order to be worked into a predetermined shape. Meanwhile, the temperature condition in the finish working step S05 is not particularly limited. However, it is preferable that the temperature condition is set to the range of −200° C. to 200° C., which corresponds to cold or warm rolling, in order to suppress recrystallization or softening. It is particularly preferable that the temperature condition is the room temperature. In addition, the processing rate is appropriately selected so that the copper alloy approximates to a final shape. However, in order to improve strength by means of work hardening in the finish working step S05, the processing ratio is preferably set to 20% or more. In addition, in a case in which additional improvement in strength is required, the processing ratio is more preferably set to 30% or more. Even more preferably, it is set to 40% or more.

(Finish Heat Treatment Step S06)

Next, a finish heat treatment is carried out on the plastically-worked material obtained using the Finish working step S05 in order to improve the stress relaxation resistance and to obtain the effect of the low temperature annealing hardening; or to remove the residual strains.

The heat treatment temperature is preferably set in a range of 100° C. to 800° C. Meanwhile, in the Finish heat treatment step S06, it is necessary to set heat treatment conditions (temperature, time, and cooling rate) so as to prevent the significant decrease of the strength due to recrystallization. For example, it is preferable that it is retained for roughly 1 second to 120 seconds at 300° C. This heat treatment is preferably carried out in a non-oxidizing atmosphere or a reducing atmosphere.

The method of the heat treatment is not particularly limited. However, a short time heat treatment with the continuous annealing furnace is preferable in view of the effect of reducing the production cost.

Furthermore, the above-described finish working step S05 and the finish heat treatment S06 may be repeatedly carried out.

As described above, the plastically-worked copper alloy material for an electronic and electric device and the rolled plate (thin plate) of the present embodiment are produced. The plate thickness of the plastically-worked copper alloy material for an electronic and electric device (thin plate) is set to the range of more than 0.05 mm to 3.0 mm or less. Preferably, the thickness is set to the range of more than 0.1 mm to less than 3.0 mm. A plastically-worked copper alloy material for an electronic and electric device (thin plate) having a thickness of less than 0.05 mm is not suitable for using as a conductive body in the high current application. In a plastically-worked copper alloy material for an electronic and electric device (thin plate) having a thickness of more than 3.0 mm, the press punching processing becomes difficult.

The plastically-worked copper alloy material for an electronic and electric device of the present invention may be used as a component for an electronic and electric device directly. Alternatively, a Sn plating layer or a Ag plating layer having the film thickness of 0.1-100 µm may be formed on one or both sides of the plate surfaces. At this time, it is preferable that the plate thickness of the plastically-worked copper alloy material for an electronic and electric device is 10-1000 times of the thickness of the plating layer.

In addition, the component for an electronic and electric device such as terminals of connectors, press-fits, or the like; relays; lead frames; bus bars; and the like, is formed by performing punching processing, bending, or the like using the copper alloy for an electronic and electric device of the present embodiment as the material.

According to the copper alloy for an electronic and electric device of the present embodiment configured as described above, the strength and the stress relaxation resistance can be improved without significantly reducing the electrical conductivity by solid soluting Mg in the copper matrix since the Mg content is set to the range of 0.15 mass % or more and less than 0.35 mass %.

In addition, the castability can be improved since it contains P in the range of 0.0005 mass % or more and less than 0.01 mass %.

In addition, formation of coarse precipitations containing Mg and P can be suppressed since the Mg content [Mg] and the P content [P], both of which are in a mass ratio, satisfy the relationship expressed by [Mg]+20×[P]<0.5. Accordingly, reduction of cold workability and bendability can be suppressed.

Moreover, the ratio between the content of Mg, which reduces the castability, and the content of P, which improves the castability, is optimized since the Mg content [Mg] and the P content [P], both of which are in a mass ratio, satisfy the relationship expressed by, [Mg]/[P]≤400 in the present embodiment. Accordingly, because of the effect of adding P, the castability can be reliably improved.

In addition, in the copper alloy for an electronic and electric device of the present embodiment, the 0.2% yield strength is set to 300 MPa or more when the tensile test is carried out in the direction orthogonal to the rolling direction; and the electrical conductivity is set to more than 75% IACS. Accordingly, the copper alloy is particularly suitable for application as a material of a component for an electronic and electric device such as terminals of connectors, press-fits, or the like; relays; lead frames; bus bars; and the like In addition, in the copper alloy for an electronic and electric device of the present embodiment, the residual stress ratio is set to 50% or more at 150° C. for 1000 hours. Accordingly, the permanent deformation can be kept small even if the copper alloy is used in a high-temperature environment. Thus, reduction of the contact pressure of connector terminals or the like can be suppressed, for example. Therefore, the copper alloy can be applied to the materials for a component of an electronic and electric device used in a high-temperature environment such as the engine room and the like.

In addition, since the plastically-worked copper alloy material for an electronic and electric device of the present embodiment is made of the above-described copper alloy for an electronic and electric device, a component for an electronic and electric device such as terminals of connectors, press-fits, or the like; relays; lead frames; bus bars; and the like can be produced by performing bending or the liken on this plastically-worked copper alloy material for an electronic and electric device.

In the case where the Sn plating layer or the Ag plating layer is formed on the surface, the plastically-worked copper alloy material is particularly suitable for the material of the component for an electronic and electric device such as terminals of connectors, press-fits, or the like; relays; lead frames; bus bars; and the like In addition, since the component for an electronic and electric device of the present embodiment (such as terminals of connectors, press-fits, or the like; relays; lead frames; bus bars; and the like) is made of the above-described copper alloy for an electronic and electric device, it can exhibit excellent properties even if it is down-sized and thinned.

Thus far, the copper alloy for an electronic and electric device, the plastically-worked copper alloy material for an electronic and electric device, and the component (terminals, and busbars), which are embodiments of the present invention, have been described, but the present invention is not limited thereto and can be appropriately modified within the scope of the technical concept of the invention.

For example, in the above-described embodiments, examples of the method for producing the copper alloy for an electronic and electric device has been described, but the production methods are not limited to the present embodiments, and the copper alloy for an electronic and electric device may be produced by appropriately selecting an existing manufacturing method.

Examples

Hereinafter, results of confirmation tests carried out in order to confirm the effects of the present invention will be described.

The copper raw material made of oxygen-free copper (ASTM B152 C10100) having the purity of 99.99 mass % or more was prepared. Then, the copper raw material was inserted in a high purity graphite crucible and subjected to high frequency melting in an atmosphere furnace of Ar gas atmosphere. Then, each of additive elements was added in the obtained copper melt to prepare the component compositions shown in Table 1. By pouring the prepared copper melt in a mold, the ingot was produced. In Example 1 of the present invention and Comparative Example 3, a mold made of an insulation material (ISOWOOL) was used. In Example 11 of the present invention, a carbon mold was used. In Examples 2-10 and 12-21 of the present invention, a copper alloy mold with water-cooling function was used as the mold for casting. The dimensions of ingots were about 20 mm of the thickness; about 150 mm of the width; and about 70 mm of the length.

A portion near the cast surface was subjected to face working; and the ingot was cut out for the size to be adjusted in such a way that the plate thickness of the final product became 0.5 mm.

This block was heated in an Ar gas atmosphere for four hours under a temperature condition shown in Table 2, thereby carrying out a homogenization/solution treatment.

After that, the heat treatment was performed in the temperature condition shown in Table 2 by using a salt bath after performing the rough rolling in the condition shown in Table 2.

The copper material that had been subjected to the heat treatment was appropriately cut in order to form a shape suitable as the final shape, and surface grinding was carried out in order to remove an oxide layer. After that, Next, finish rolling (finish work) was carried out in the rolling ratio shown in Table 2 at the room temperature, and a thin plate having the thickness of 0.5 mm, the width of about 150 mm, and the length of 200 mm was produced. In addition, after the finish rolling (finish work), a finish heat treatment was carried out in an Ar atmosphere under a condition shown in Table 2, and then water quenching was carried out, thereby producing a thin plate for characteristic evaluation.

(Castability)

As an evaluation of castability, the presence or absence of rough surface during the above-described casting was observed. One having no visually recognized rough surface at all or one having almost no visually recognized rough surface was graded as "A." One with a minor rough surface with the depth of less than 1 mm was graded as "B." One with rough surface with the depth of 1 mm or more and less than 2 mm was graded as "C." One with a major rough surface with the depth of 2 mm or more was graded as "D" and evaluations were terminated prematurely. Evaluation results are shown in Table 3.

The depth of rough surface means the depth of the rough surface from the end part toward the central part of the ingot.

(Mechanical Properties)

A No. 13B test specimen regulated by JIS Z 2241 was sampled from a strip material for characteristic evaluation, and the 0.2% yield strength was measured using the offset method of JIS Z 2241. The test specimen was sampled in the direction perpendicular to the rolling direction. Evaluation results are shown in Table 3.

(Electrical Conductivity)

A test specimen having a width of 10 mm and a length of 150 mm was sampled from the strip material for characteristic evaluation, and the electric resistance was obtained using a four-terminal method. In addition, the dimensions of the test specimen were measured using a micrometer, and the volume of the test specimen was computed. In addition, the electrical conductivity was calculated from the measured electric resistance and the volume. Meanwhile, the test specimen was sampled so that the longitudinal direction of the test specimen became perpendicular to the rolling direction of the strip material for characteristic evaluation.

Evaluation results are shown in Table 3.

(Bendability)

Bending working was carried out on the basis of the method of Japan Copper and Brass Association Technical Standard JCBA-T307:2007, the testing method 4.

A plurality of test specimens having a width of 10 mm and a length of 30 mm were sampled from the thin plate for characteristic evaluation so that the bending axis became orthogonal with respect to the rolling direction; and a W bending test was carried out using a W-shaped jig having a bending angle of 90 degrees and a bending radius of 0.5 mm (R/t=1).

The outer circumferential portion of the bent portion was visually observed, and a test specimen in which cracking was observed was graded as "C." A test specimen in which a major folding was observed was graded as "B." A test specimen with no observable folding was graded as "A." Grades A and B were regarded as acceptable bendability. Evaluation results are shown in Table 3.

(Stress Relaxation Resistance)

In a stress relaxation resistance test using a method specified in a cantilever screw method of JCBA (Japan Copper and Brass Association)-T309:2004, a stress was applied to the specimen. In the test, the specimen was held at the temperature of 150° C. for 1000 hours, and the residual stress ratio thereof was measured. Evaluation results are shown in Table 3.

In the test method, a specimen (width: 10 mm) was collected from each of the strips for characteristic evaluation in a direction perpendicular to the rolling direction. An initial deflection displacement was set as 2 mm, and the span length was adjusted such that a surface maximum stress of the specimen was 80% of the yield strength. The surface maximum stress was determined from the following expression.

$$\text{Surface Maximum Stress (MPa)} = 1.5 \, Et\delta_0/L_s^2$$

wherein,

E: Young's modulus (MPa), t: Thickness of sample (t=0.25 mm), $\delta_0$: Initial deflection displacement (2 mm), and $L_s$: Span length (mm)

The residual stress ratio was measured from the bent portion after the test piece was held for 1000 hours at a temperature of 150° C. to evaluate stress relaxation resistance. The residual stress ratio was calculated using the following expression.

$$\text{Residual Stress Ratio (\%)} = (1 - \delta_t/\delta_0) \times 100 \text{ wherein}$$

$\delta_t$: Permanent deflection displacement (mm) after holding at 150° C. for 1000 hours—permanent deflection displacement (mm) after holding at the room temperature for 24 hours, and $\delta_0$: Initial deflection displacement (mm)

TABLE 1

| | | Mg mass % | P mass % | Cu | [Mg] + 20 × [P] | [Mg]/[P] |
|---|---|---|---|---|---|---|
| Example of the present invention | 1 | 0.16 | 0.0005 | balance | 0.17 | 320 |
| | 2 | 0.16 | 0.0092 | balance | 0.34 | 17 |
| | 3 | 0.18 | 0.0052 | balance | 0.28 | 35 |
| | 4 | 0.19 | 0.0091 | balance | 0.37 | 21 |
| | 5 | 0.20 | 0.0032 | balance | 0.26 | 63 |
| | 6 | 0.22 | 0.0086 | balance | 0.39 | 26 |

TABLE 1-continued

|   | Mg mass % | P mass % | Cu | [Mg] + 20 × [P] | [Mg]/[P] |
|---|---|---|---|---|---|
| 7  | 0.23 | 0.0056 | balance | 0.34 | 41 |
| 8  | 0.26 | 0.0025 | balance | 0.31 | 104 |
| 9  | 0.27 | 0.0060 | balance | 0.39 | 45 |
| 10 | 0.28 | 0.0097 | balance | 0.47 | 29 |
| 11 | 0.26 | 0.0009 | balance | 0.28 | 289 |
| 12 | 0.25 | 0.0097 | balance | 0.44 | 26 |
| 13 | 0.27 | 0.0088 | balance | 0.45 | 31 |
| 14 | 0.25 | 0.0074 | balance | 0.40 | 34 |
| 15 | 0.24 | 0.0079 | balance | 0.40 | 30 |
| 16 | 0.30 | 0.0097 | balance | 0.49 | 31 |
| 17 | 0.32 | 0.0086 | balance | 0.49 | 37 |
| 18 | 0.31 | 0.0008 | balance | 0.33 | 388 |

TABLE 1-continued

|   |   | Mg mass % | P mass % | Cu | [Mg] + 20 × [P] | [Mg]/[P] |
|---|---|---|---|---|---|---|
|  | 19 | 0.33 | 0.0043 | balance | 0.42 | 77 |
|  | 20 | 0.34 | 0.0077 | balance | 0.49 | 44 |
|  | 21 | 0.34 | 0.0010 | balance | 0.36 | 340 |
| Comparative Example | 1 | 0.02 | 0.0006 | balance | 0.03 | 33 |
|  | 2 | 0.47 | 0.0012 | balance | 0.49 | 392 |
|  | 3 | 0.59 | 0.0010 | balance | 0.61 | 590 |
|  | 4 | 0.34 | 0.0986 | balance | 2.31 | 3 |
|  | 5 | 0.34 | 0.0098 | balance | 0.54 | 35 |
|  | 6 | 0.42 | 0.0065 | balance | 0.55 | 65 |
|  | 7 | 0.30 | 0.0123 | balance | 0.55 | 24 |

TABLE 2

|   |   | Casting Cooling rate (° C./sec.) | Homogenization/solution treatment Temperature (° C.) | Rough rolling Rolling ratio (%) | Intermediate heat treatment Temperature (° C.) | Intermediate heat treatment Time (min) | Finish rolling Rolling ratio (%) | Finish heat treatment Temperature (° C.) | Finish heat treatment Time (min) |
|---|---|---|---|---|---|---|---|---|---|
| Example of the present invention | 1 | 0.4 | 500 | 70 | 500 | 1 | 40 | 300 | 1 |
|  | 2 | 10 | 500 | 80 | 500 | 5 | 30 | 300 | 1 |
|  | 3 | 10 | 500 | 90 | 500 | 1 | 60 | 300 | 2 |
|  | 4 | 10 | 500 | 80 | 500 | 5 | 40 | 300 | 5 |
|  | 5 | 10 | 600 | 80 | 500 | 10 | 60 | 300 | 1 |
|  | 6 | 10 | 700 | 80 | 500 | 2 | 50 | 300 | 1 |
|  | 7 | 10 | 700 | 60 | 550 | 1 | 30 | 350 | 1 |
|  | 8 | 10 | 700 | 80 | 550 | 1 | 60 | 350 | 1 |
|  | 9 | 10 | 700 | 80 | 550 | 1 | 60 | 300 | 1 |
|  | 10 | 10 | 700 | 80 | 550 | 10 | 60 | 400 | 1 |
|  | 11 | 0.8 | 700 | 90 | 550 | 1 | 60 | 300 | 5 |
|  | 12 | 10 | 700 | 80 | 550 | 1 | 50 | 300 | 2 |
|  | 13 | 10 | 700 | 80 | 550 | 5 | 60 | 350 | 1 |
|  | 14 | 10 | 700 | 60 | 550 | 5 | 60 | 300 | 1 |
|  | 15 | 10 | 700 | 60 | 600 | 1 | 80 | 300 | 5 |
|  | 16 | 10 | 700 | 80 | 550 | 1 | 60 | 300 | 1 |
|  | 17 | 10 | 700 | 80 | 550 | 1 | 60 | 350 | 1 |
|  | 18 | 10 | 700 | 80 | 550 | 1 | 80 | 350 | 1 |
|  | 19 | 10 | 700 | 60 | 450 | 15 | 60 | 300 | 1 |
|  | 20 | 10 | 700 | 80 | 500 | 5 | 70 | 300 | 1 |
|  | 21 | 10 | 700 | 80 | 600 | 2 | 60 | 350 | 1 |
| Comparative Example | 1 | 10 | 500 | 70 | 400 | 2 | 35 | 250 | 1 |
|  | 2 | 10 | 700 | 70 | 600 | 5 | 75 | 300 | 1 |
|  | 3 | 0.4 | Evaluations were cancelled because the depth of the rough surface on the ingot was too deep | | | | | | |
|  | 4 | 10 | 700 | Evaluations were cancelled because a large edge cracking occurred in the rough rolling | | | | | |
|  | 5 | 10 | 700 | Evaluations were cancelled because a large edge cracking occurred in the rough rolling | | | | | |
|  | 6 | 10 | 700 | Evaluations were cancelled because a large edge cracking occurred in the rough rolling | | | | | |
|  | 7 | 10 | 700 | Evaluations were cancelled because a large edge cracking occurred in the rough rolling | | | | | |

TABLE 3

|   |   | Castability | 0.2% yield strength (MPa) | Electrical conductivity (% IACS) | Residual stress ratio (%) | Bendability |
|---|---|---|---|---|---|---|
| Example of the present invention | 1 | B | 331 | 88.2 | 61 | A |
|  | 2 | A | 302 | 89.2 | 52 | A |
|  | 3 | A | 388 | 86.0 | 53 | A |
|  | 4 | A | 326 | 85.4 | 68 | A |
|  | 5 | A | 342 | 84.8 | 72 | A |
|  | 6 | A | 380 | 84.1 | 59 | A |
|  | 7 | A | 339 | 83.7 | 82 | A |
|  | 8 | A | 403 | 82.3 | 81 | A |
|  | 9 | A | 447 | 79.6 | 75 | A |
|  | 10 | A | 366 | 79.6 | 84 | A |

TABLE 3-continued

|  |  | Castability | 0.2% yield strength (MPa) | Electrical conductivity (% IACS) | Residual stress ratio (%) | Bendability |
|---|---|---|---|---|---|---|
|  | 11 | B | 427 | 82.0 | 79 | A |
|  | 12 | A | 401 | 83.6 | 80 | A |
|  | 13 | A | 408 | 80.6 | 81 | A |
|  | 14 | A | 389 | 83.7 | 78 | A |
|  | 15 | A | 450 | 84.1 | 82 | A |
|  | 16 | A | 457 | 79.0 | 78 | B |
|  | 17 | A | 438 | 78.3 | 81 | B |
|  | 18 | B | 480 | 78.6 | 71 | A |
|  | 19 | A | 462 | 75.4 | 68 | A |
|  | 20 | A | 476 | 76.1 | 72 | B |
|  | 21 | B | 443 | 75.2 | 83 | A |
| Comparative Example | 1 | A | 261 | 97.3 | 18 | A |
|  | 2 | B | 512 | 69.8 | 71 | B |
|  | 3 | D | — | — | — | — |
|  | 4 | A | — | — | — | — |
|  | 5 | A | — | — | — | — |
|  | 6 | A | — | — | — | — |
|  | 7 | A | — | — | — | — |

In Comparative Example 1, the Mg content was lower than the range defined in the scope of the present invention; the 0.2% yield strength was low; and the strength was insufficient.

In Comparative Example 2, the Mg content was higher than the range defined in the scope of the present invention; and the electrical conductivity was reduced.

In Comparative Example 3, the Mg content was higher than the range defined in the scope of the present invention; [Mg]/[P] exceeded 400; and very deep rough surface was formed. Therefore, evaluations afterward were cancelled.

In Comparative Example 4, the Mg content was higher than the range defined in the scope of the present invention; and a large cracked edge was formed in the rough rolling. Therefore, evaluations afterward were cancelled.

In Comparative Examples 5-7, [Mg]+20×[P] exceeded 0.5; and a large cracked edge was formed in the rough rolling. Therefore, evaluations afterward were cancelled.

Contrary to that, it was confirmed that the 0.2% yield strength, the electrical conductivity, the stress relaxation resistance, bendability, and castability were excellent in Examples of the present invention.

Based on these result, it was confirmed by Examples of the present invention that copper alloy for an electronic and electric device and plastically-worked copper alloy for an electronic and electric device having excellent electrical conductivity; strength; bendability; stress relaxation resistance; and castability were provided

INDUSTRIAL APPLICABILITY

Compared to the conventional technologies, a copper alloy for an electronic and electric device; a plastically-worked copper alloy material for an electronic and electric device; a component for an electronic and electric device; a terminal; and a busbar, each of which has excellent electrical conductivity, strength, bendability, stress relaxation resistance and castability, can be provided.

The invention claimed is:

1. A copper alloy for an electronic and electric device comprising:
   Mg in a range of 0.15 mass % or more and less than 0.35 mass %;
   P in a range of 0.0005 mass % or more and less than 0.0075 mass %; and
   a Cu balance including inevitable impurities, wherein
   a Mg content [Mg] and a P content [P], both of which are in a mass ratio, satisfy relationships expressed by [Mg]+20×[P]<0.5 and [Mg]/[P]≤400, and
   an electrical conductivity of the copper alloy is more than 75% International Annealed Copper Standard (IACS).

2. The copper alloy for an electronic and electric device according to claim 1, wherein
   a 0.2% yield strength is 300 MPa or more when a tensile test is carried out in a direction orthogonal to a rolling direction.

3. The copper alloy for an electronic and electric device according to claim 1, wherein a residual stress ratio is 50% or more at 150° C. for 1000 hours.

4. A plastically-worked copper alloy material for an electronic and electric device made of the copper alloy for an electronic and electric device according to claim 1.

5. The plastically-worked copper alloy material for an electronic and electric device according to claim 4, wherein a Sn plating layer or a Ag plating layer is provided on a surface of the plastically-worked copper alloy material.

6. A component for an electronic and electric device made of the plastically-worked copper alloy material for an electronic and electric device according to claim 4.

7. A terminal made of the plastically-worked copper alloy material for an electronic and electric device according to claim 4.

8. A busbar made of the plastically-worked copper alloy material for an electronic and electric device according to claim 4.

9. The copper alloy for an electronic and electric device according to claim 1, wherein
   when the copper alloy is tested for bendability, no observable folding is found in a plurality of test specimens, each of which having a width of 10 mm and a length of 30 mm is sampled from a thin plate for characteristic evaluation so that a bending axis becomes orthogonal with respect to a rolling direction, and
   bendability of the copper alloy is determined by a W bending test using a W-shaped jig having a bending angle of 90 degrees and a bending radius of 0.5 mm (R/t=1) on the basis of the method of Japan Copper and Brass Association Technical Standard JCBA-T307: 2007, the testing method 4.

10. The copper alloy for an electronic and electric device according to claim 1, wherein the copper alloy is produced through the steps of: melt casting; homogenization/solution treatment; rough cool working; intermediate heat treatment; finish cool working; and finish heat treatment, and the finish heat treatment is carried out at a temperature in a range of 100° C. to 800° C. so as to prevent a decrease in strength due to recrystallization.

11. The copper alloy for an electronic and electric device according to claim 1, wherein the Mg content [Mg] and the P content [P] further satisfy relationships expressed by $[Mg]+20\times[P]<0.48$ and $25<[Mg]/[P]\leq 400$.

* * * * *